Jan. 18, 1966   A. W. NELSON ET AL   3,230,290
COMPOSITE GASKET AND METHOD OF APPLYING SAME
Filed Feb. 23, 1961

- THERMOSETTING RESIN
- DUCTILE WIRE
- STEEL CORE
- GASKETING MATERIAL
- NON-POROUS PLIANT SHEATH

INVENTORS:
ARTHUR W. NELSON
ROLLIN W. KNAPP
BY: Oswald W. Milmore
THEIR ATTORNEY

3,230,290
COMPOSITE GASKET AND METHOD OF APPLYING SAME
Arthur W. Nelson, San Leandro, and Rollin W. Knapp, San Pablo, Calif., assignors to Shell Oil Company, New York, N.Y., a corporation of Delaware
Filed Feb. 23, 1961, Ser. No. 91,226
16 Claims. (Cl. 264—320)

The invention relates to the sealing of rigid faces, such as contiguous edges or flanges of containers, casings, conduits and pressure vessels with gaskets. More particularly, it provides a composite gasket and a method of applying such a gasket whereby to conform the gasket more readily to the faces to be sealed and achieve such shape conformity with less bolt loading for a given degree of resiliency of the sealing layer than was possible in prior constructions.

The gasket of this invention can be constructed to adapt it to high-pressure service and/or is suitable for use when corrosive fluids are encountered. The gasket is, therefore, especially although not exclusively useful in sealing objects having sealing faces that are fragile, e.g., made of or coated with a ceramic material, wherein it is not feasible to apply great bolt loads and/or which are not or cannot be machined or ground to present true sealing surfaces.

Gaskets generally include a cushion layer of resilient material, such as asbestos fibers, rubberized fibers (fibers coated with and/or embedded in a martix of rubber or rubber-like composition), hard rubber, or other composition, which layer is situated adjacent to the rigid face to be sealed, said resilient layer being either in direct contact wth the rigid face or separated therefrom only by a pliant sheath which is non-porous and usually corrosion-resistant to isolate the said cushion layer from the contents of the vessel or the like. When the faces to be sealed are drawn together the cushion material is deformed to conform its surface to that of the adjacent rigid face. This drawing together is herein for convenience called bolt loading, it being understood that it is often effected by means other than bolts.

When bolt loading is applied the cushion layer undergoes two types of deformation: its surface is indented where small projections occur in the adjacent rigid face due to irregularities therein, and other parts of the gasket fill the valleys in said face. In addition, the resilient material is compressed bodily at certain regions at which the rigid faces are closer together than at other regions, having regard to the thickness characteristics of the gasket. For example, if an annular gasket has parallel faces and one of the rigid faces is flat while the other is slightly conical, one radial extremity of the gasket is compressed considerable before any compressive stress is applied to the other radial extremity; the same occurs when the rigid faces are both flat and the gasket is shaped with non-parallel faces. Both of the above-mentioned deformations are encountered in practice unless the rigid faces are carefully constructed, which usually involves machining or grinding to form true surfaces. These may but need not be flat and parallel.

It is evident from the foregoing that the term "resilient," as used herein with reference to the deformable cushion layer of the gasket, denotes a property which is rubber-like in its ability to adopt a shape in conformity to the rigid faces to be sealed.

When the gasketed joint must withstand high fluid pressures it is necessary to use for the cushion, materials which have greater resistance to being blown out. This makes it necessary to employ resilient materials which are less readily deformed by compression, i.e., wherein a greater bolt load is required to achieve a given deformation. Such materials are sometimes called "hard."

It is often for various reasons not feeasible or possible to machine or grind the rigid sealing faces to form true surfaces. This is the case, for example, when vitreous- or ceramic-lined steel vessels, sometimes known as "glassed steel" vessels, or brick-lined vessels are dealt with. Such surfaces are not suitable for sealing by such less readily deformable gaskets, designed for operation at elevated pressure, without resorting to bolt loads so high as to destroy the integrity of the ceramic or vitreous surface.

It is, therefore, a principal object of the invention to seal such untrue or uneven faces in a way that excessive bolt loading is avoided.

In summary, according to the invention the rigid faces are sealed by an intervening composite gasket which includes a hard core, an intermediate layer of convertible resin which is in the flowable state when the gasket is emplaced and is capable of hardening into a cohesive mass, and an outer cushion layer of a resilient gasketing material; the latter may be more or less yieldable than the hardened resin. A low bolt load is applied to pressurize the flowable resin, thereby causing it to press the resilient layer everywhere against the adjacent rigid face, adapting it the the general contour of such face, and to mold the resin. The resin is then permitted to harden, preferably with continued application of the partial bolt load. When hardening is complete or substantially so the full bolt load is applied to deform the resilient material further and effect a seal.

In most instances there are two layers of resin, one on each side of the hard gasket core, with a cushion layer of resilient material on the outer side of each layer of resin. However, the invention is not restricted to such a symmetrical construction, it being possible to omit one layer of the resin, whereby one of the cushion layers adjoins the core. This would find particular application when the rigid face adjacent to the last-mentioned layer is true.

In a preferred embodiment two additional features are present:

Firstly, the composite gasket includes a sheath of non-porous, pliant, corrosion-resistant material which envelops the cushion layers and one edge of the gasket, so as to lie immediately adjacent to the rigid faces to be sealed and protect the other parts of the gasket from aggressive fluid. In this instance the flowable resin leads to the added advantage that the pocket within the sheath adjoining the inner edge of the core becomes filled with resin, which supports the sheath and prevents deterioration by repeated flexure of the sheath. A suitable material for the sheath is polytetrafluoroethylene resin in sheet form, available commercially under the trade-name Teflon. It is inert to many chemicals, tough and usually heat-resistant.

Secondly, retaining means, such as wires of ductile-metal, e.g., lead, copper or steel or hoops of an elastomer, are provided at one or both radial extremities of each layer of resin to confine the resin and prevent excessive radial flow when bolt loading is applied. This permits a greater pressure to be maintained within the resin layer for shaping the resilient cushion layer. It is desirable to use retaining means which can undergo compression because of its shape and/or because of the nature of its material of construction. When a sheath is provided as was mentioned previously the retaining means is preferably omitted at the radial edge which is covered by the sheath to permit the resin to flow into the pocket within the sheath; the retaining means at the other radial extremity assists in inducing flow into the pocket. When the gasket is in service after hardening of the resin the retaining means, which extend completely about the gasket, may in certain embodiments reinforce the resin and increase its structural integrity against blow-out when subjected to high fluid pressure.

The convertible resin is preferably a liquid thermosetting resin which hardens within a reasonably short time, such as five minutes to ten hours, and, if necessary, contains a suitable curing agent. Examples of such resins are the epoxy resins, polyesters, urea-formaldehyde and phenol-formaldehyde.

In the case of epoxy resins the curing agent is preferably a member of the group consisting of amines, polybasic acids, polybasic acid anhydrides and metal halides; examples of these members are, respectively, diethylene triamine, adipic acid, phthalic anhydride and stannous chloride.

Curing agents for polyester resins includes peroxides, such as benzoyl peroxide.

Urea-formaldehyde and phenol-formaldehyde resins can be cured by heating.

The formulation of the resin may be chosen to produce a hardened resin which is less deformable than the cushion, i.e., is essentially rigid, or to produce a product having the same or a higher deformability, so as to be classified as an elastomer. The resins are known per se and no detailed description thereof is, therefore, made herein. For a more complete description of certain suitable resins reference is made to the U.S. patent to Shokal, No. 2,633,458, dated March 31, 1953.

The invention will be further described with reference to the accompanying drawing forming a part of this specification and showing certain preferred embodiments, wherein.

Figure 1:
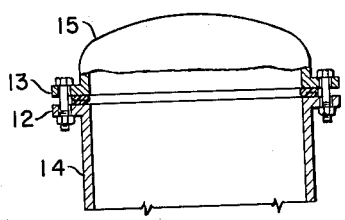
FIGURE 1 is a vertical sectional view of part of a pressure vessel to which the gasket of the invention is applied.
Figure 2:
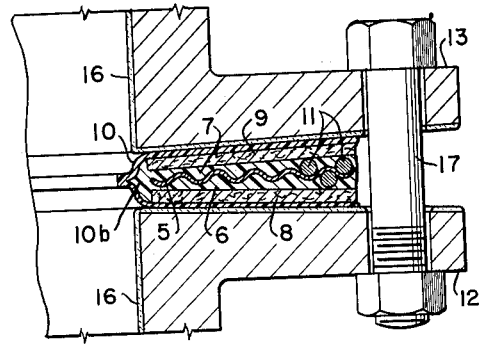
FIGURE 2 is an enlarged view of a part of FIGURE 1, showing the gasket in place.
Figure 3:
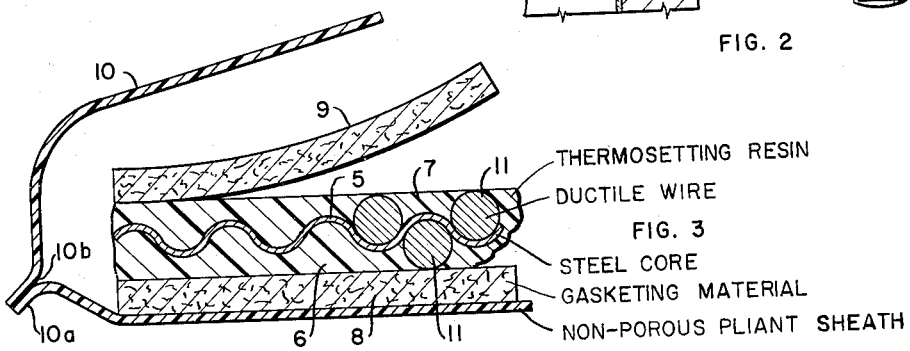
FIGURE 3 is a sectional view of the gasket during assembly thereof.

Referring to FIGURES 1-3 of the drawing in detail, the gasket includes a hard core 5, layers 6 and 7 of a convertible resin, and cushion layers 8 and 9 of resilient gasketing material. Preferably it further includes a sheath 10 of non-pervious, pliant sheet material enveloping the upper and lower faces and the inner edge of the gasket, and retaining means, embodied in this instance as ductile metal wires 11, each of which is a complete hoop encircling the resin layers 6, 7.

The sheath 10 is shown to have a bead 10a at which the integral upper and lower flaps are united; this conformation would result when the sheath is cut from a cylindrical block having a large central bore by making a deep annular incision partly to the bore before cutting the slice. Behind this bead there is an annular pocket 10b, adjoining the core 5. Such a pocket may also occur when the sheath is formed of sheet material which is laid about the gasket.

When intended for high-pressure applications the core 5 is preferably of strong metal such as steel and has circumferential corrugations as shown. The retaining wires 11, e.g., made of lead and of diameters to dam the resin 6, 7, against escape, are laid into these corrugations prior to applying the resin, which is applied in the flowable, preferably tacky or highly viscous state as shown in FIGURE 3. The cushion layers 8 and 9, e.g., made of asbestos fibers, are laid immediately after the resin has been applied. The sheath 10 is then emplaced to enclose the other parts. The resin may be any resin capable of setting within a reasonably short time, as previously explained. In this embodiment when intended for high-pressure use, the resin is such as to form a hardened mass which is relatively hard, i.e., which can be deformed by pressure to a smaller extent or to only a slightly greater extent than the cushion layer.

The assembled gasket is then emplaced between the rigid faces to be sealed, as is shown in FIGURE 2. These may, for example, be the flanges 12 and 13 of conjoined parts of a pressure vessel 14 and its dome 15 (FIGURE 1) which may be lined with a ceramic layer 16 ("ceramic" being used herein to include vitreous or similar fracturable materials). Such a layer cannot be machined or ground to produce a true sealing surface, with the consequence that the flange faces may have any of a variety of geometrical relations, e.g., outwardly divergent as shown in FIGURE 2. The gasket, on the other hand, initially had substantially flat upper and lower faces. The flanges are then drawn together by bolts 17 to apply pressure to the gasket and the flowable resin.

While the flanges are bolted up, the gasket is deformed to conform to the flanges, causing the resin to flow. The wires 11 restrain outflow of resin. When the wires 11 are placed into compression between the cushions and the core, a seal is formed around the layer of plastic, thereby more effectively restricting the escape of resin. The bolt loading is brought to about one-fourth of the ultimate load, which results in a slight flattening of the wires against the core 5 and indentation of the cushions 8 and 9. The wires are restrained against outward displacement by the corrugations and by the bolt loading. The flowable plastic layers are thereby subjected to a hydrostatic pressure whereby the resin flows to fill all voids within the sheath, including the pocket 10b behind the bead, and to deform the gasket to the contour of the flange faces. In essence, the flange faces act as a mold.

The resin layers 6 and 7 and the ring of resin in the pocket 10b are then allowed to harden. When hardening is completed the bolts 17 are tightened to apply the full bolt load and further compress the resilient layers 8 and 9 to obtain a pressure seal.

Although the invention was described with particular reference to a seal between two rigid faces which may not be true it may also be applied for forming gaskets of special shapes to surfaces which may have substantially prefect but different or non-parallel geometrical shapes, e.g., slightly conical as shown in FIGURE 2, or for forming gaskets having parallel faces when the cushion layers are, for any reason, of non-uniform thickness.

In the high-pressure gasket described the resin layers 6 and 7 are thin and relatively hard and hoop strength is provided principally by the metal core. In this embodiment the corrugations prevent the hardened resin from shifting radially outwards. The ductile lead wires supply little or no hoop strength.

Figure 4:
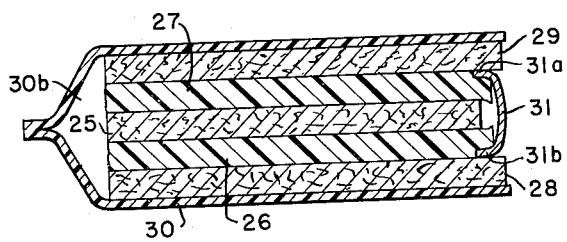
FIGURE 4 is a sectional view of an alternative embodiment of a gasket prior to molding wherein an asbestos core is used, the gasket being shown in its form prior to compression.

For moderate or low pressures it is not necessary to employ a metal core. Such a construction is shown in FIGURE 4, wherein the core 25 is a flat annulus of hard asbestos, having layers 26 and 27 of flowable resin, on which cushions 28 and 29 are laid, all surrounded by a pliant sheath 30. The retaining means in this construction is a metal ring 31 having any suitable shape to permit it to be compressed. Thus, as shown, it has downwardly and upwardly inclined flanges 31a and 31b, respectively, and/or slightly convex outwardly as shown.

When the gasket of FIGURE 4 is compressed between flange faces as described for the first embodiment the ring 31 is deformed to form a seal, thereby placing the flowable plastic under hydrostatic pressure and causing it to fill all voids, including pocket 30b, and deform the gasket. The resin may, in this instance, have a greater deformability, i.e., it may be an elastomer after setting. The ring 31 provides hoop strength to retain both the core and resin layers against blow-out.

Figure 5:
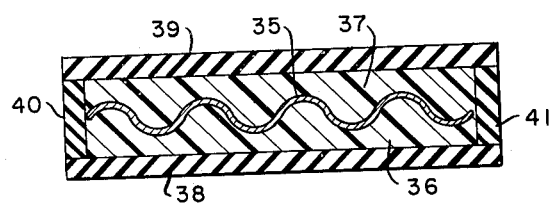
FIGURE 5 is a sectional view of a third embodiment wherein elastic retaining rings are used.

FIGURE 5 shows another embodiment wherein retaining means are provided at both the inner and outer radial extremities of the gasket, the sheath is omitted, and elastomer retaining rings are used. The gasket includes a core 35 of any suitable hard material, such as corrugated steel, flowable resin layers 36 and 37, cushion layers 38 and 39 of resilient gasket material, preferably of rubber composition, and inner and outer rings 40 and 41 made of rubber or similar readily compressible material. When the gasket is compressed between rigid flanges the sealing rings 40 and 41 are compressed to seal the flowable plastic layers 36 and 37, causing pressure build-up and flow before setting as was described above. In this instance the retaining rings provide essentially no hoop strength.

Figure 6:
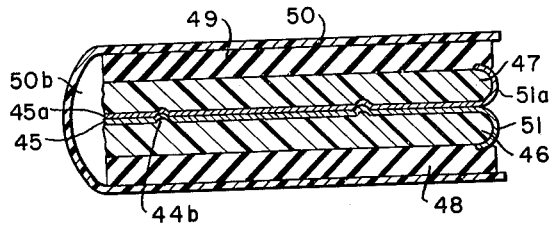
FIGURE 6 is a sectional view of a fourth construction wherein the retaining means is integral with the core.

FIGURE 6 show a construction wherein the retaining means are integral with the core, which includes a pair of annuli 45, 45a, optionally provided with interlocking beads 44b and having flanges 51 and 51a, respectively, at their outer radial extremities. These flanges are curved to permit deformation upon compression. The gasket further includes layers 46 and 47 of flowable resin, cushions 48 and 49 of resilient gasket material, and a thin sheath 50 of non-porous pliant material. The sheath is in this instance shown without the bead, but still providing a pocket 50b, which is filled with resin when the gasket is subjected to compression before the resin sets. The core 45–45a is, in this embodiment, usually of metal.

We claim as our invention:

1. Method of forming a gasket which comprises the steps of emplacing between two rigid faces to be sealed a composite gasket which includes a core, an intermediate layer of a convertible resin which is in the flowable state and capable of setting to form a hard mass, and an outer cushion layer of resilient gasket material, applying pressure to the gasket by moving said faces together and thereby causing the resin to flow and to deform the cushion to a shape in conformity to said faces, and allowing the resin to harden.

2. The method according to claim 1 wherein said resin is an epoxy resin which contains an epoxy curing agent.

3. The method according to claim 2 wherein the curing agent is a member of the class consisting of amines, polybasic acids, polybasic acid anhydrides and metal halides.

4. Method according to claim 1 wherein the fluid pressure in said resin is increased by sealing the margins of the layer.

5. Method of forming and applying a gasket which comprises the steps of emplacing between two rigid faces to be sealed a composite gasket which includes a core, an intermediate layer of a convertible resin which is in the flowable state and capable of setting to form a hard mass, and an outer cushion layer of resilient gasket material, applying pressure to the gasket by moving said faces together and thereby causing the resin to flow and to deform the cushion to a shape in conformity to said face, allowing the resin to harden, and thereafter applying additional pressure by said faces to further deform the cushion layer.

6. The method according to claim 1 wherein the edges of said layer of convertible resin are at least partly confined during the application of pressure to restrain the outflow of said resin, pressure being maintained on the gasket by said faces during the hardening of the resin.

7. Method of forming a gasket which comprises the steps of emplacing between two rigid annular faces to be sealed a composite gasket which includes an annular, radially elongated hard core, an annular outer cushion layer of resilient gasket material on each side of said core, and on each side of said core between the core and the corresponding cushion layer and intermediate annular layer of a convertible, thermosetting resin which is in the flowable state and capable of setting to form a hard mass, applying pressure to the gasket by moving said faces together while restraining the edges of said layers of convertible resin to restrain the outflow of said resin, thereby deforming the cushion to a shape in conformity to said faces and placing the resin under pressure, and allowing the resin to harden while pressure is maintained on the gasket by said faces.

8. A composite gasket for sealing relatively stationary surfaces comprising: a core; an outer cushion layer of resilient gasket material which is substantially resistant to flow at elevated temperature; a layer of a convertible, thermosetting resin intermediate the core and cushion layer, said resin being capable of being hardened from the flowable state to form a hard mass while interposed between the said core and cushion after pressure is applied to the gasket by said surfaces to be sealed; and retaining means at least at one edge of the layer of resin for restraining the outflow of said resin during said application of pressure.

9. A gasket as defined in claim 8 wherein said core is a radially elongated annulus of metal having circumferential corrugations and said retaining means includes a compressible hoop of wire seated in a furrow of the core corrugations near one edge of the intermediate layer.

10. A gasket as defined in claim 8 wherein said core is a radially elongated annulus and said retaining means is a metal band extending circumferentially along an edge of said core and from the core to the cushion layer, said band being readily deformable when pressure is applied to the gasket to stress principally the other parts of the gasket.

11. A gasket as defined in claim 8 wherein said core is annular in outline and said retaining means is a ring of elastically compressible material extending between the core and the cushion layer and having a radial dimension that is small in relation to that of the cushion, whereby pressure applied to the gasket stresses principally the other parts of the gasket.

12. A gasket as defined in claim 8 wherein said core is a radially elongated annulus of metal and said retaining means is a metallic flange integral with said core and about the said radial edge of the resin layer extending to the cushion layer.

13. A composite gasket as defined in claim 8 wherein said resin is an epoxy resin.

14. A composite gasket for sealing relatively stationary annular surfaces comprising: a hard core ring which is radially extended to provide opposed annular faces; a pair of substantially flat annular cushion rings of resilient gasket material which is substantially resistant to flow at elevated temperature, said core ring being harder than the cushion ring material, said cushion rings being situated one on each side of said core ring; an annular layer of convertible thermosetting resin intermediate each said cushion ring and the core ring, each resin layer being in contact with a face of the core ring and in contact with an opposite one of said cushion rings, said resin being capable of being hardened from the flowable state to form a hard mass while interposed between the core ring and said cushion rings after pressure is applied to the gasket by said annular surfaces to be sealed; retaining means for restraining the outflow of said resin from said resin layers during said application of pressure so as to cause a build-up of pressure, said retaining means being provided at both the radially inner and outer edges of said resin layers.

15. A gasket as defined in claim 14 wherein said gasket includes a sheath of non-porous, pliant material which envelops the outer annular faces and one edge of the gasket, the part of the sheath enveloping said one edge being the retaining means at said edge and being in part spaced from the core ring to form a pocket containing resin.

16. A composite gasket for sealing relatively stationary surfaces comprising: a core; an outer cushion layer of resilient gasket material which is substantially resistant to flow at elevated temperature; a layer of a convertible, thermosetting resin intermediate the core and cushion layer, said resin being capable of being hardened from the flowable state to form a hard mass while interposed between the said core and cushion after pressure is applied to the gasket by said surfaces to be sealed; a sheath of non-porous, pliant material enveloping the outer faces and one edge of the gasket, said sheath extending away from the core at said one edge to form a pocket adjoining the core, said pocket being filled with said resin and constituting retaining means at said one edge for restraining the outflow of resin during application of pressure to the gasket, and retaining means at an edge of the gasket opposite to said one edge for restraining outflow of said resin during said application of pressure.

References Cited by the Examiner

UNITED STATES PATENTS

| | | | |
|---|---|---|---|
| 2,151,096 | 3/1939 | Freedlander | 154—46 |
| 2,240,263 | 4/1941 | Lillis | 154—46 |
| 2,580,546 | 1/1952 | Hobson | 288—33 |
| 2,596,162 | 5/1952 | Muskat | 154—110 |
| 2,809,130 | 10/1957 | Rappaport | 117—138.8 |
| 2,982,683 | 5/1961 | Boyce | 154—110 |
| 3,009,722 | 11/1961 | Augustin | 277—235 |

FOREIGN PATENTS 1,104,775   4/1961   Germany.

EARL M. BERGERT, *Primary Examiner.*

CARL F. KRAFFT, *Examiner.*